Sept. 18, 1956 H. CORBETT 2,763,374
APPARATUS FOR SCREENING PLASTIC MATERIALS
Filed July 2, 1952
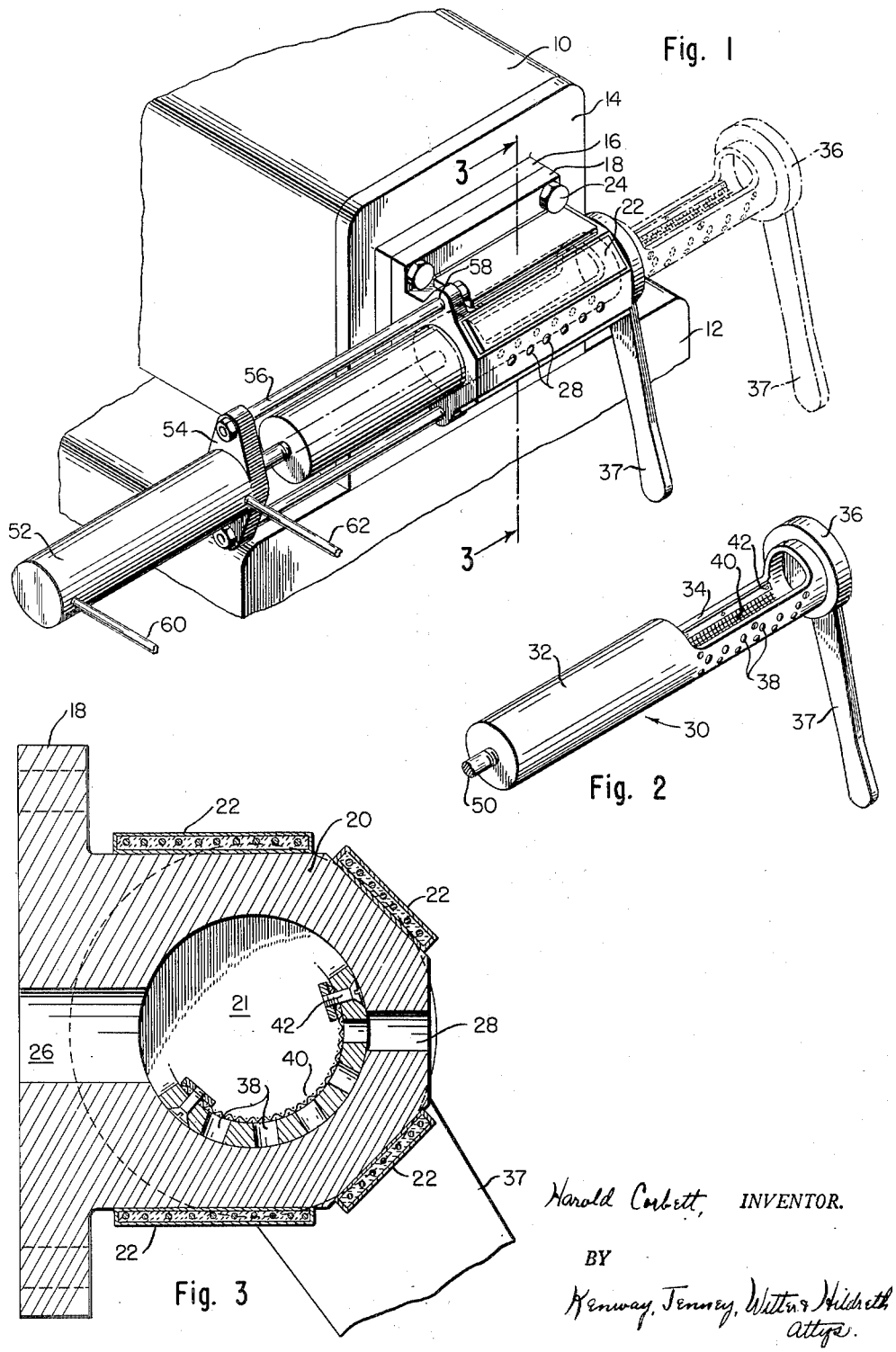
Harold Corbett, INVENTOR.
BY
Kenway, Jenney, Witter & Hildreth
attys.

United States Patent Office 2,763,374
Patented Sept. 18, 1956

2,763,374

APPARATUS FOR SCREENING PLASTIC MATERIALS

Harold Corbett, Denville, N. J., assignor, by mesne assignments, to Reed-Prentice Corporation, Worcester, Mass., a corporation of Massachusetts Application July 2, 1952, Serial No. 296,917

10 Claims. (Cl. 210—152)

My invention relates to apparatus for extruding plastics and plastic materials and, in particular, to a device for screening out impurities and contaminants prior to the emergence of the plastic from the die.

In another aspect my invention pertains to a device which also permits a simple inspection and sampling of the plastic material as it emerges from the extruder.

Although the art of plastic extruding has always contended with problems arising from the presence in the heated pressurized material of foreign bodies, hard lumps, and the like, the problem has become more acute in recent years by virtue of the fact that practical economies of the industry require the use of scrap plastics which are particularly contaminated with undesirable substances such as metal pieces, dirt, and the like. On occasion hard undigested lumps of pigment are also found in the softened body of plastic.

In consequence it has been found necessary to interpose a screen between the discharge end of an extruder and the die, and such screens have customarily been attached to hinged gates secured to the front of the machine. However, at the end of an uncertain time the screen becomes so clogged as to prohibit the passage of plastic to the die, and the back pressure brought about by the clogging of the screen may damage the extruder, even to the extent of blowing off its front plate. Operators must therefore be painstaking in observing the action of the machine and stop the operation when production begins to decrease as the result of clogged screens.

To clean the conventional screen it is first necessary to shut down the machine and unbolt the hinged gate, a difficult matter because of the pressure upon it. When the gate is opened a relatively large volume of plastic spews on the floor, the screen is cleaned or replaced, and the gate once more bolted in place. When the machine is started again, it requires considerable time before plastic begins to discharge from it.

The primary object of my invention is to improve the efficiency of plastic extruding machines.

Another object of the invention is drastically to reduce the time required for cleaning the screen of a plastic extruding machine.

Another object of the invention is materially to lengthen the time during which a screen may be satisfactorily used before cleaning is necessary.

Another object of my invention is to provide means whereby a screen can be cleaned of contaminants without waste of plastic.

An important feature of my invention resides in a chambered member permanently secured to an extruder and fitted with a slidably mounted screen arranged for ejection and inspection and combined with a shut-off valve automatically operable to close the discharge orifice as the screen is ejected.

Another feature of the invention consists in a chambered member secured to the extruder and containing a rotatable member carrying a fine screen, whereby one area of the screen becomes clogged, the operator may rotate the member to bring into play a fresh, clean area of the screen.

These and other objects and features of my invention will be more readily understood and appreciated from the following detailed description of a preferred embodiment thereof selected for purposes of illustration as the best embodiment now known to me for carrying out the purposes of the invention and shown in the accompanying drawing, in which:

Fig. 1 is a view in perspective of a screening device constructed in accordance with the invention, Fig. 2 is a view in perspective of the tubular screen-carrying member, and Fig. 3 is a view in cross-section along the line 3—3 of Fig. 1.

The extruder per se forms no part of my invention and is therefore merely represented in the drawing by the casing 10 mounted on a flat base 12. The front plate 14 of the extruder 10 is provided with a nozzle or discharge plate 16 having an appropriate port or passage (not shown) through which the heated molten plastic is forced under pressure.

The device of my invention includes a casting having a base flange 18 which is secured to the nozzle plate 16 by a plurality of bolts 24. As best shown in Fig. 3, the base plate 18 is integral with a barrel portion 20 of generally cylindrical shape and providing a thick-walled cylindrical chamber 21. The exterior of the barrel 20 is provided with a plurality of flats upon which are secured elongated strip heaters 22 of conventional type.

There is also provided an inlet port 26 leading from the discharge orifice of the extruder 10 to the chamber 21, while the forward wall of the chamber 21 is provided with a number of discharge ports 28. The number of ports 28 is entirely a matter of choice and design and may be varied to suit the particular needs of a given operation.

Mounted for rotation within the chamber 21 is a stiff, rigid cylindrical member 30, best shown in Fig. 2, having one half constituted by a solid portion 32, and the other half a hollow tube cut away as shown at 34 and provided with a plurality of rows of ports 38, with each row matching the number and arrangement of the ports 28 in the chamber 21. The end of the tubular portion is closed by a flanged end plate 36 integral with a handle 37.

A flexible metal screen 40 is secured to the inner face of the tube by means of a plurality of screws 42 in position to overlie the ports 38, as best shown in Fig. 3. The tube serves as a perforated stiffening means arranged for movement across the openings 28 by means of the handle 37, while the flexible fine mesh screen serves to prevent the passage through the ports 28 of everything except the molten plastic. Consequently impurities, foreign bodies, and particles or lumps of undesired materials are collected in the tube behind the screen.

In the embodiment shown in the drawing there are five rows of ports 38 in the arcuate face of the semi-cylindrical portion of the movably mounted tube 30. Whenever the flow of plastic begins to diminish due to clogging of the screen 40, the operator has merely to shift the handle 37 to bring another row of ports 38 into play. To some extent the screen and ports 38 are self-clearing. That is to say, it has been found that as a consequence of shifting the tube from the first position, then to the second after the first has become contaminated, then to the third after the second has become contaminated, and so on through all of the positions, that by the time the last position becomes clogged the contamination which was concentrated on the screen at the first position has shifted and the first position can be reused. This also holds true as to the remainder of the positions on the tube so that the operator is able to repeat this process several times before the entire screen becomes clogged. Consequently, before the entire screen becomes clogged, it has done the equivalent work of anywhere between eight to twenty or more screens were the work done by conventional means.

However, the screen 40 must be cleaned at intervals, and it is also desirable to be able to sample the plastic material from time to time without wasting material or shutting down the machine. To these ends I provide mechanism for ejecting the tube through the open end of the chamber 21. Secured to the solid end 32 of the member 30 is a piston rod 50 which carries at its outer end a piston (not shown) housed in a cylinder 52. This cylinder 52 is held in axial alignment with the barrel 20 by means of a pair of rods 56 which are secured at their ends to a pair of flanged plates 54 and 58, said plates being integral with the opposed ends of the cylinder and barrel, respectively.

The cylinder 52 is served by a pair of conduits 60 and 62 through which compressed air or hydraulic fluid may be forced to operate the piston. When fluid is forced through the conduit 60, the piston is forced to the right and moves the member 30 from the full line position shown in Fig. 1 to the dotted line position shown therein. The resulting movement ejects the tubular half of the member 30 from the chamber 21, while, at the same time, the solid half of this member slides across the end of the passage 26 and across the ends of the ports 28, acting as a valve to shut off the flow of plastic material. The operator may then dump the refuse by turning the handle 37 to invert the screen; then he may scrape the screen clean. When the screen has been cleaned, it is only necessary to force fluid through the conduit 62 in order to pull the member 30 back into operating position. The extruder loses no pressure or material during the cleaning operation, although the operator, of course, shuts off the machine before operating the ejection mechanism.

The same operations are performed whenever the operator desires to sample the plastic in order to ascertain whether the mix is proper or whether the extruder is performing satisfactorily.

It will be obvious to those skilled in the art that the embodiment herein shown and described is susceptible to alterations not only with respect to dimensions and number of ports but also in manner of operation. For example, instead of providing for rotation of the screen within the chamber 21, I may lengthen the hollow tube and the screen 40 and use the cylinder 52 to translate them axially in step movements. However, the concept of the invention would be the same, i. e. moving across the discharge ports a flexible screen mounted on a stiff perforated supporting strip.

Having now described and illustrated a preferred embodiment of the invention, what I claim as new and desire to secure by Letters Patent of the United States is:

1. Apparatus of the class described, comprising walls forming an open-ended cylindrical chamber having a transverse port, a stiff tube rotatably mounted in said chamber and having a cut-away portion and a plurality of ports opposite said cut-away portion, a flexible screen secured to the inner wall of said tube in position to overlie said ports, means for rotating said tube, and means for translating said tube axially to expose said cut-away portion and screen beyond an open end of the chamber.

2. Apparatus of the class described, comprising walls forming an open ended cylindrical chamber having transverse inlet and outlet ports, a stiff tube rotatably mounted in said chamber and having a solid portion and a cut-away portion and a plurality of through-and-through holes opposite said cut-away portion, a flexible screen secured to the inner wall of said tube in position to overlie said holes, the area covered by said holes and screen being larger than that of the outlet port, means for rotating said tube to shift successive portions of the area of said screen and holes across said outlet port, and means for translating said tube axially simultaneously to expose said cut-away portion and screen beyond an open end of the chamber and to move said solid portion of the tube in position to close said inlet and outlet ports.

3. Apparatus of the class described, comprising a cylindrical chamber having a row of horizontally aligned spaced outlet ports, an inlet port for said chamber, a semi-cylindrical member mounted for rotational and translational movement within said chamber and having a plurality of rows of horizontally aligned spaced passages, said rows of spaced passages each adapted to register with said row of outlet ports, means operatively associated with said semi-cylindrical member for rotating said member to selectively position any one of said rows of spaced passages in registration with said row of outlet ports, and means operatively associated with said member for translationally moving said member to displace axially said rows of passages from said row of outlet ports.

4. Apparatus of the class described, comprising an open ended chamber having an arcuate wall, said wall having an outlet port therethrough, an inlet port for said chamber, a flexible screen rotatably mounted within said chamber overlying said arcuate wall restricting communication between said inlet and outlet ports, stiffening means secured to said screen for holding said screen in its overlying position, means for rotating said screen in said chamber whereby different portions of said screen may be selectively employed to restrict communication between said inlet and outlet ports, and means for axially translating said screen in said chamber to expose said screen beyond the open end of said chamber.

5. A device as characterized by claim 4 wherein valve means are operatively associated with said stiffening means closing said outlet port when said screen is exposed beyond the open end of said chamber.

6. Apparatus of the class described, comprising a cylindrical chamber having a transverse inlet port and a plurality of outlet ports, a cylindrical member having a solid portion and a cut-away portion axially spaced from said solid portion and movably mounted in said chamber, means operatively associated with said cut-away portion permitting filtered communication of said inlet port with said outlet port through said chamber, and means for axially moving said cylindrical member to move said cut-away portion out of said chamber and to move said solid portion between said inlet and outlet ports preventing communication of said inlet port with said outlet port through said chamber.

7. Apparatus of the class described, comprising walls forming an open ended cylindrical chamber having transverse inlet and outlet ports, a flexible screen rotatably mounted within said chamber overlying said outlet port, means for rotating said screen in said chamber permitting selective employment of portions of said screen to restrict communication between said inlet and outlet ports, and means for translating said screen axially of said chamber to expose said screen beyond the open end of said chamber.

8. Apparatus of the class described, comprising walls forming a chamber, transverse inlet and outlet ports in the walls of said chamber for passing fluid through said chamber, means rotatably and translationally movable within said chamber, a first portion of said means being adapted to prevent fluid communication between said inlet and outlet ports, a second portion of said means being adapted to overlie said outlet port for filtering fluid passing through said chamber, a member operatively associated with said means for selectively changing the part of said second portion filtering fluid passing through said chamber, and means for moving said second portion translationally out of said chamber and moving said first portion into fluid communication preventing position.

9. Apparatus of the class described comprising a chamber having an arcuate wall, an inlet port to said chamber, a row of outlet ports in said wall, a hollow member having an arcuate face juxtaposed to said wall and mounted for rotational movement in said chamber, a plurality of rows of passages in said arcuate face of said member, each of said rows of passages being individually registrable with said row of outlet ports, a screen fixed to said member and overlying all of said rows of passages, means operatively associated with said member for selectively aligning any row of passages with said row of outlet ports, and means for moving said hollow member axially out of said chamber.

10. Apparatus for screening plastic materials comprising a chamber, inlet and outlet openings in said chamber for permitting the passage of molten plastic material through said chamber, a screening member movably mounted within said chamber and positioned adjacent said outlet opening, said screening member having a screening area of considerably greater extent than the cross-sectional area of said outlet opening, means for adjusting the position of said screening member within said chamber so as to cause successive and different portions of said screening area to overlie said outlet opening, and means for moving said screening member bodily out of said chamber so that said screening area is entirely beyond said outlet opening.

References Cited in the file of this patent

UNITED STATES PATENTS

| | | |
|---|---|---|
| 637,264 | Jennison | Nov. 21, 1899 |
| 724,752 | Stafford | Apr. 7, 1903 |
| 780,334 | Freeman | Jan. 17, 1905 |
| 784,170 | Miller | Mar. 7, 1905 |
| 1,608,460 | Blankinship | Nov. 23, 1926 |
| 1,767,895 | Pierce | June 24, 1930 |
| 1,879,474 | Pontoppidan | Sept. 27, 1932 |
| 1,945,491 | Lamort | Jan. 30, 1934 |
| 1,968,741 | Burrell | July 31, 1934 |
| 2,066,479 | MacIsaac | Jan. 5, 1937 |
| 2,465,404 | Sonntag | Mar. 29, 1949 |
| 2,512,394 | Sullivan | June 20, 1950 |

FOREIGN PATENTS

| | | |
|---|---|---|
| 432,119 | Germany | July 24, 1926 |